United States Patent

Weimer et al.

[15] 3,683,313

[45] Aug. 8, 1972

[54] PLUG-IN BUS DUCT WITH HEAT DISSIPATION MEANS

[72] Inventors: Charles L. Weimer, Beaver Falls; Samuel S. Fouse, Aliquippa, both of Pa.

[73] Assignee: Westinghouse Electric Corporation, Pittsburgh, Pa.

[22] Filed: May 24, 1971

[21] Appl. No.: 146,204

[52] U.S. Cl. ................339/22 B, 174/88 B, 174/99 B

[51] Int. Cl. ..............................................H01r 13/60

[58] Field of Search...339/14, 19, 22, 242; 174/88 B, 174/99 B

[56] References Cited

UNITED STATES PATENTS

| | | | |
|---|---|---|---|
| 3,391,378 | 7/1968 | Fisher | 339/22 B |
| 3,472,946 | 10/1969 | Vincent | 174/68 |
| 3,519,730 | 7/1970 | Fouse et al. | 174/88 |

*Primary Examiner*—Marvin A. Champion
*Assistant Examiner*—Robert H. Hafer
*Attorney*—A. T. Stratton, Clement L. McHale and W. A. Elchik

[57] ABSTRACT

An elongated section of bus duct comprises a plurality of compact regions and a plurality of plug-in regions along the length thereof. The compact regions are provided for dissipation of heat and the plug-in regions are provided for tapping power off of the duct.

10 Claims, 11 Drawing Figures

PATENTED AUG 8 1972

3,683,313

SHEET 2 OF 5

PLUG-IN BUS DUCT WITH HEAT DISSIPATION MEANS

CROSS-REFERENCES TO RELATED APPLICATIONS

Parts of the bus duct disclosed herein are disclosed in the copending applications of Bill M. Shannon et al. entitled "Bus Duct With Hinged Cover For Plug-In Region" Ser. No. 146,205 and of Charles L. Weimer entitled "Bus Duct With Improved Means For Connecting Housing Structures" Ser. No. 146,202 both of which applications are filed concurrently herewith.

BACKGROUND OF THE INVENTION

1. Field of the Invention

Plug-in type bus duct.

2. Description of the Prior Art

The patent to Charles L. Weimer et al. U.S. Pat. No. 3,459,872, issued Aug. 5, 1969 discloses bus duct comprising a plurality of bus bars sandwiched between a pair of opposite housing members in a compact relationship for heat dissipation with the bus bars being formed intermediate the ends thereof for receiving a power take-off unit.

The patent to Charles L. Weimer et al. U.S. Pat. No. 3,444,311 issued May 13, 1969 discloses bus duct wherein the bus bars are sandwiched in the housing in a compact relationship.

The patent to Fisher U.S. Pat. No. 3,384,856, issued May 21, 1968 discloses bus duct comprising a plurality of bus bars sandwiched between opposite housing members in a compact relationship with the bus bars being formed outwardly in an edgewise direction to provide access for power take-off members.

SUMMARY OF THE INVENTION

An elongated unitary section of bus duct comprises an elongated unitary housing and a set of a plurality of elongated unitary bus bars supported in the housing. Each of the bus bars comprises a pair of opposite wide faces and a pair of opposite narrow faces. The bus bars are supported in the housing in a generally stacked relationship with the wide faces thereof being in a face-to-face relationship. The set of bus bars comprises a pair of connecting end parts at the opposite ends thereof. At each of the connecting end parts the bus bars are spaced to receive additional bus bars and insulating means in a lap-type connection. The bus bars are also formed to provide a plurality of compact regions and a plurality of plug-in regions along the length of the section. At each of the compact regions, the bus bars are sandwiched in a face-to-face compact relationship between a pair of opposite housing members for heat dissipation. The bus bars are spaced at each of the plug-in regions. A separate plug-in insulating member is supported in the housing at each of the plug-in regions to support the bus bars and to provide insulation between adjacent bus bars and between adjacent plug-in members. Each of the plug-in insulating members has opening means therein open at a narrow-face side of the section for receiving plug-in members, and the housing is provided with opening means therein at each of the plug-in regions to provide access to the opening means in the plug-in insulating members. The compact regions are provided for dissipation of heat and the plug-in regions are provided for tapping power off of the bus duct.

DESCRIPTION OF THE PREFERRED EMBODIMENT

Figure 1A:
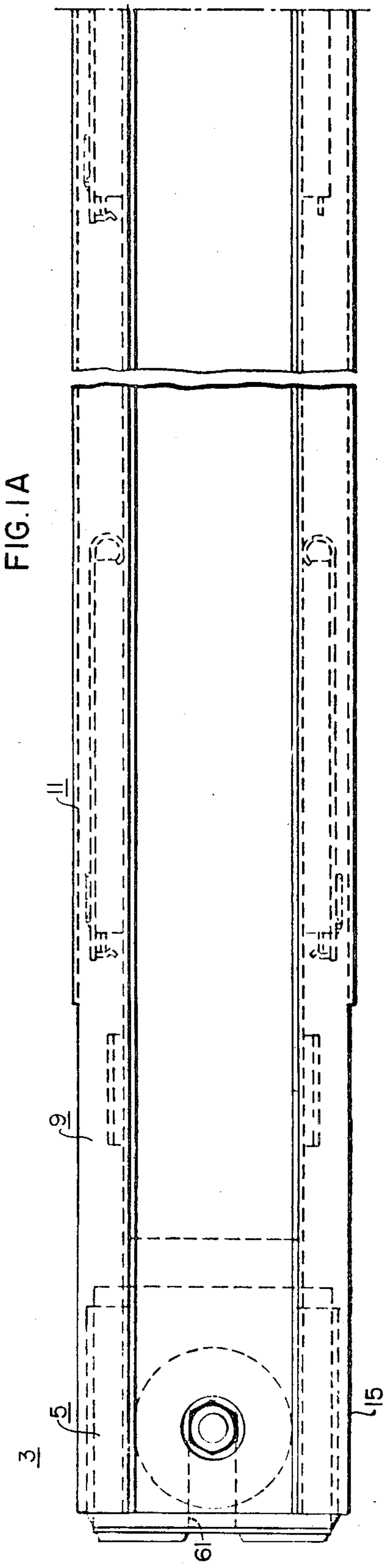
FIGS. 1A and 1B are a top plan view, with parts broken away, of a section of bus duct constructed in accordance with principles of this invention. The figure is illustrated on two separate sheets because of space limitation on the drawing paper.

Referring to the drawings, there is shown in FIGS. 1A, 1B, 2A and 2B an elongated section 3 of bus duct comprising a first connecting-end part 5 at one end thereof, a second connecting end part 7 at the other end thereof, a plurality of compact regions 9 intermediate the ends thereof and a plurality of plug-in regions 11 intermediate the ends thereof. The compact regions 9 and plug-in regions 11 are alternately disposed along the length of the section 3. As can be understood with reference to the figure 5, parts of the section of bus duct are broken away in view of space limitations of the drawing paper. The section 3 comprises five plug-in areas 11 with compact regions on the opposite ends of the each plug-in regions along the length of the bus duct. It can be understood that the number of plug-in regions and compact regions can be changed without digressing from the spirit of this invention.

The section 3 is an elongated unitary section comprising an elongated unitary housing 15 and a set of four elongated unitary bus bars 17 supported in the housing 15. Only one of the compact regions 9 and only one of the plug-in regions 11 will be specifically described with reference to FIGS. 3 and 4, it being understood that the description applies to all of the compact regions and plug-in regions.

Figures 6, 7, 8, 9:
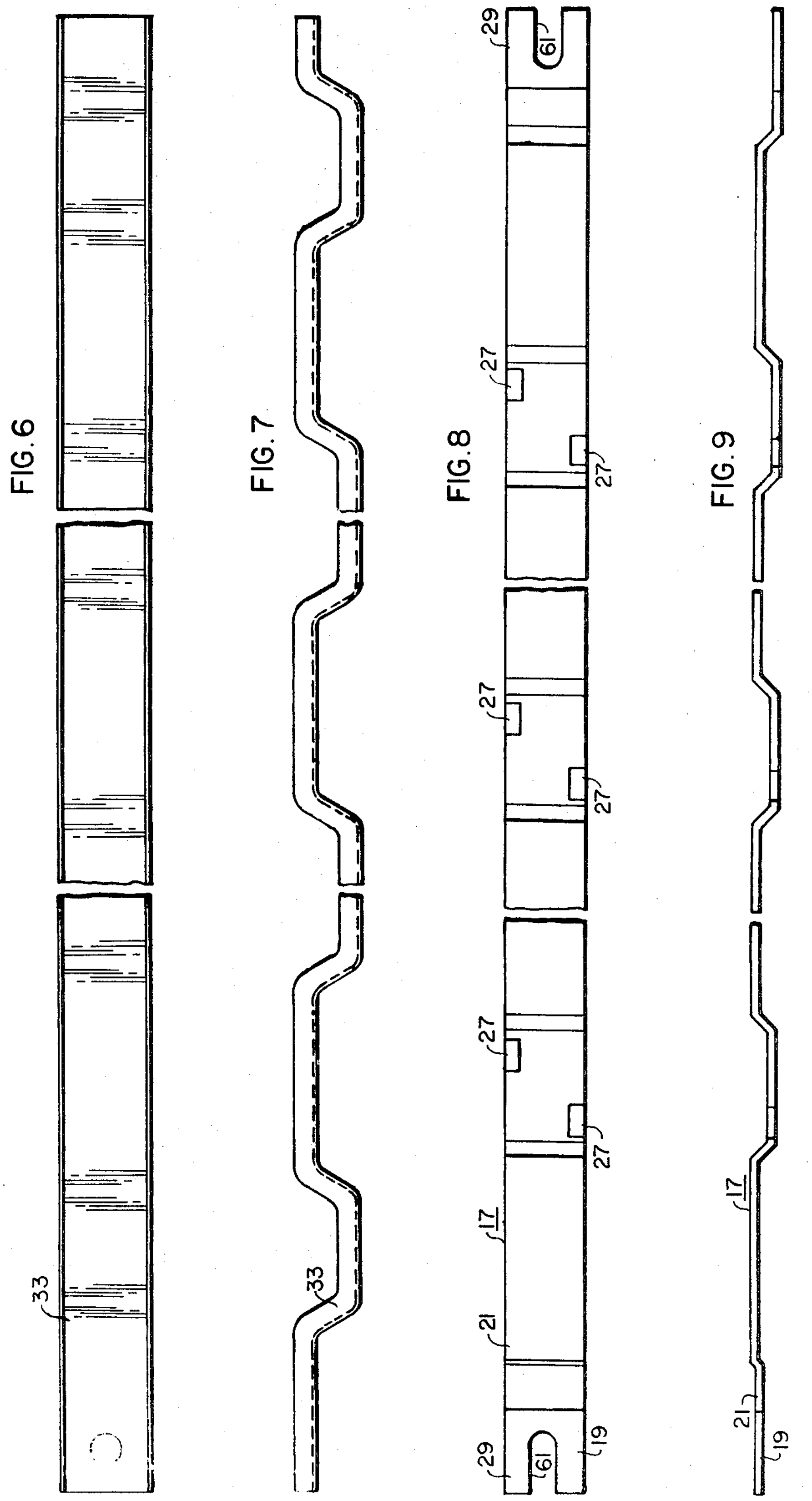
FIG. 6 is a top plan view, with parts broken away, of one of the housing members of the bus duct.
FIG. 7 is a side view, with parts broken away, of the housing member illustrated in FIG. 6.
FIG. 8 is a top plan view, with parts broken away, of one of the bus bars of the bus duct.
FIG. 9 is a side view, with parts broken away, of the bus bar illustrated in FIG. 8.

The bus bars 17 are sandwiched together in a compact relationship at each of the compact regions 9 (FIG. 3) and they are off-set at each of the plug-in regions 11 (FIG. 4) to facilitate the top off of power at the plug-in regions. Each of the bus bars 17 comprises a conducting bar 19 and an insulating sleeve 21 supported on the conducting bar 19 (FIGS. 8 and 9). Additional insulating sheets 23 (FIG. 3) are provided between adjacent insulated bus bars 17 and between the outermost bus bars, and an additional insulating cover 24 surrounds the set of compacted bus bars interposed between the set of compacted bus bars and the housing 15. As can be understood with reference to FIG. 8, each of the bus bars comprises a plurality of uninsulated portions 27 for connection with plug-in members and uninsulated end portions 29 to provide for connection with bus bars of similar sections of bus duct.

Figure 3:
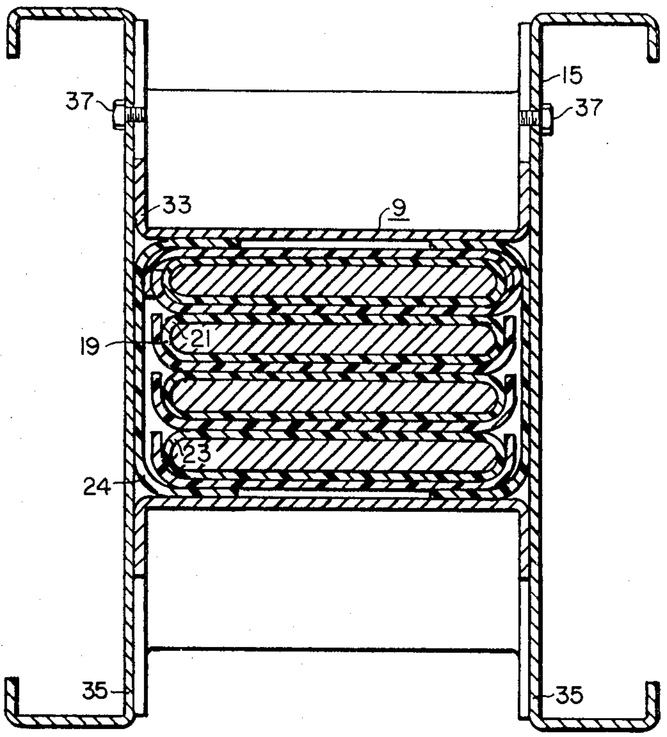
FIG. 3 is a sectional view taken generally along the line III—III of FIG. 1A.
Figure 4:
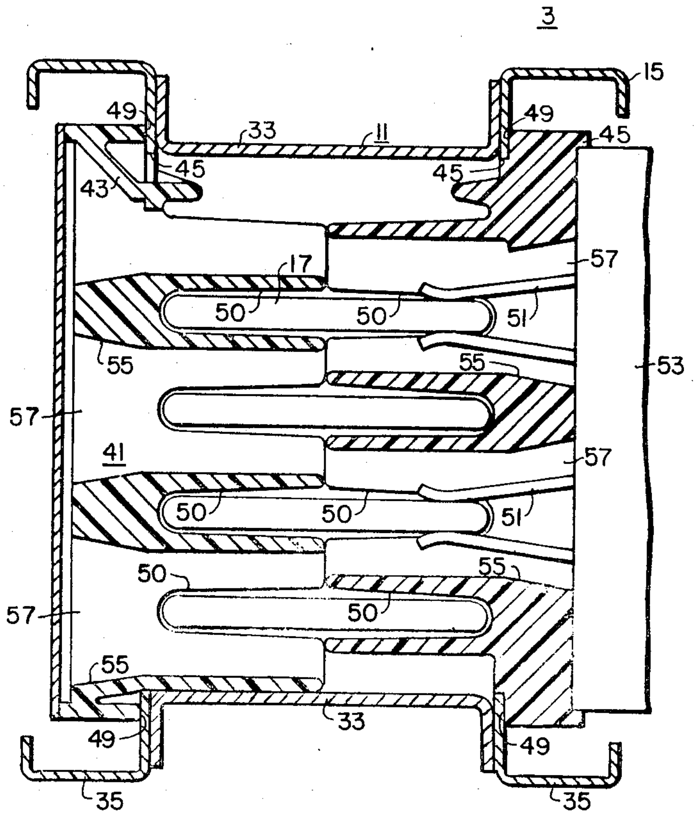
FIG. 4 is a sectional view taken generally along the line IV—IV of FIG. 2A with part of a plug-in unit added to illustrate the plug-in capability of bus duct.

The housing 15 comprises a first pair of opposite housing members 33 and a second pair of opposite housing members 35 which cooperate to provide an elongated tubular housing structure. As can be seen in FIGS. 3 and 4, each of the housing members 33 is generally U-shaped in cross-section. As can be understood with reference to FIGS. 1A, 1B, 2A, 2B, 6–9, the bus bars are formed to provide the compact regions and the spaced plug-in regions, and the housing members 33 are formed with a tortuous path along the length thereof extending toward each other at the compact regions 9 to compact the bus bars 17 therebetween in a sandwiched relationship and extending away from each other at the plug-in regions 11 to provide space in order to facilitate plug-in capability. The housing members 33 are heat conducting members of aluminum or base alloys of aluminum in order to provide for heat dissipation from the bus bars 17. As can be understood with reference to FIG. 3, the housing members 35 are generally C-shaped with the free ends of the legs thereof bent over toward each other. The housing members 35 are rigid members of steel to provide structural strength. During assembly of the bus duct, the bottom member of the housing members 33 (FIG. 3) is welded or otherwise fixedly secured to the two housing members 35. Thereafter, the bus bars 17 and insulating sheets are moved down into the mounted position on the three housing parts. Thereafter, the top or uppermost of the housing members 33 is pressed down into the position shown in FIG. 3 sandwiching the bus bars 17 between the housing members 33 at the compact regions 9 in a compact sandwiched relationship, and a plurality of bolts 37 are secured to the uppermost housing member 33 and the housing members 35 to secure the housing and bus duct assembly together.

After the bus bars are mounted in the housing, plug-in insulating means indicated generally at 41 (FIG. 4) is mounted in the housing at each of the plug-in regions 11. Each of the plug-in insulating means 41 comprises a pair of rigid molded plug-in insulating members 43, 45. As can be understood with reference to FIGS. 1, 2 and 4, each of the housing members 35 is provided with an opening 45 therein at each of the plug-in regions 11. Each of the plug-in insulating members 43, 45 is moved into the position seen in FIG. 4 through the associated opening 45. The plug-in insulating members 43, 45 are shaped with the outer parts larger than the openings 45 and they engage the housing members 35 at the stop parts 49 to limit inward movement of the plug-in insulating members. Thereafter, four screws (not shown) are applied to the four corners of each of the plug-in insulating members and screwed into the associated housing member 35 to secure the plug-in insulating members 43, 45 in the mounted position seen in FIG. 4. As can be understood with reference to FIG. 4, each of the plug-in insulating members 43, 45 is formed with slots 50 for receiving and supporting the bus bars 17, and with insulating barrier means molded integral therewith for insulating adjacent bus bars 17 and for insulating adjacent plug-in members 51 of a plug-in unit 53 from each other. As can be understood with reference to FIGS. 2A, 2B and 4, each of the plug-in insulating members 43, 45 is provided with four openings 55 therein that lead into four well portions 57 with each well portion having a portion of a separate one of the bus bars 17 therein and with each opening 55 being over a separate one of the bus bars 17 so that the four openings 55 and well portions 57 provide access to the four bus bars 17. The positioning of the well portions 57 and openings 55 is staggered (FIGS. 2A and 2B) so that there is adequate room for plugging into the bus duct with four plug-in members 51 and adequate room for the insulating barriers (FIG. 4) between the bus bars and between the plug-in members 51. As can be understood with reference to FIG. 4, a plug-in unit 53 is shown in a plug-in position with two of the clip-on type plug-in members 51 clipped onto two of the bus bars. It can be understood that two additional clip-on type plug-in members 51 of the same plug-in unit 53 are plugged into the other two openings 55 (FIGS. 2A and 2B) and plugged onto the other two bus bars in the same manner as is illustrated by the two plug-in members 51 in FIG. 4. As can be understood with reference to FIG. 4, at each of the plug-in regions 11 there is plug-in capability from each of the two opposite sides of the bus duct. As can be understood with reference to FIG. 8, each of the bus bars is provided with uninsulated portions 27 along the length thereof at each plug-in region for receiving the four plug-in members 51 of the plug-in unit in clip-on type engagement to facilitate the tapping of power off of the bus duct.

Figure 2A:
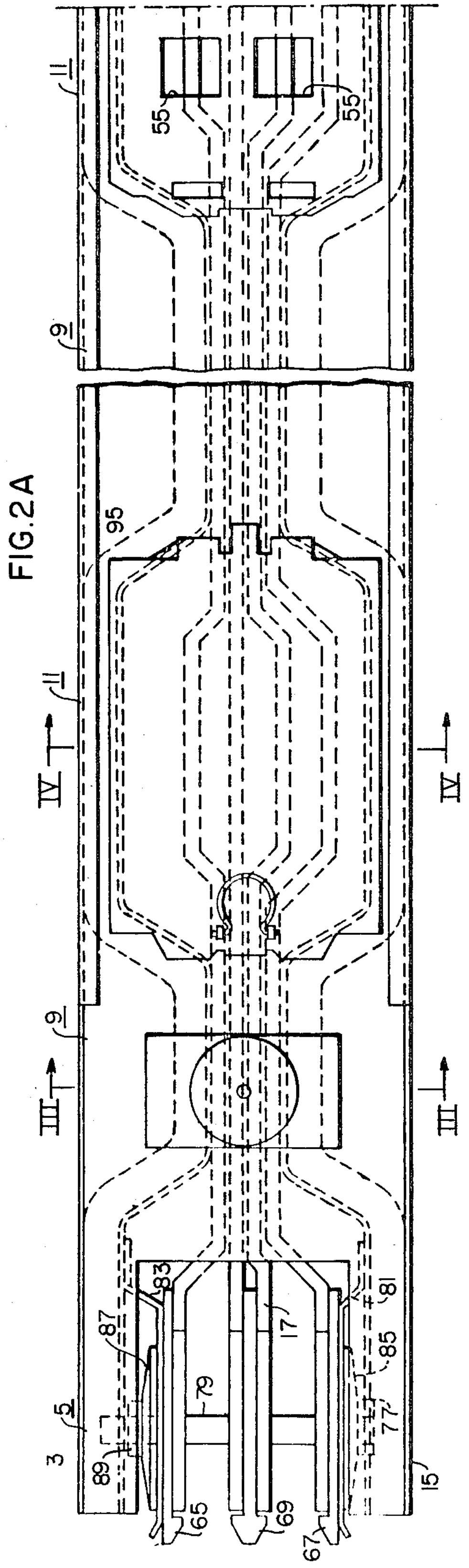
FIGS. 2A and 2B are a side view, with parts broken away, of the bus duct section of FIGS. 1A and 1B.
Figure 1B:
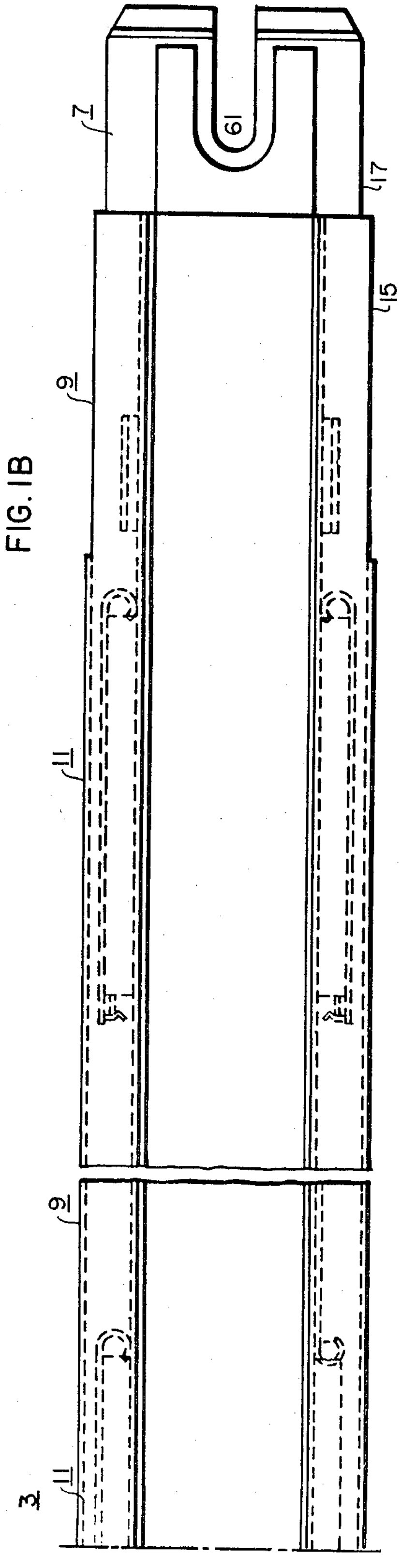
Figure 2B:
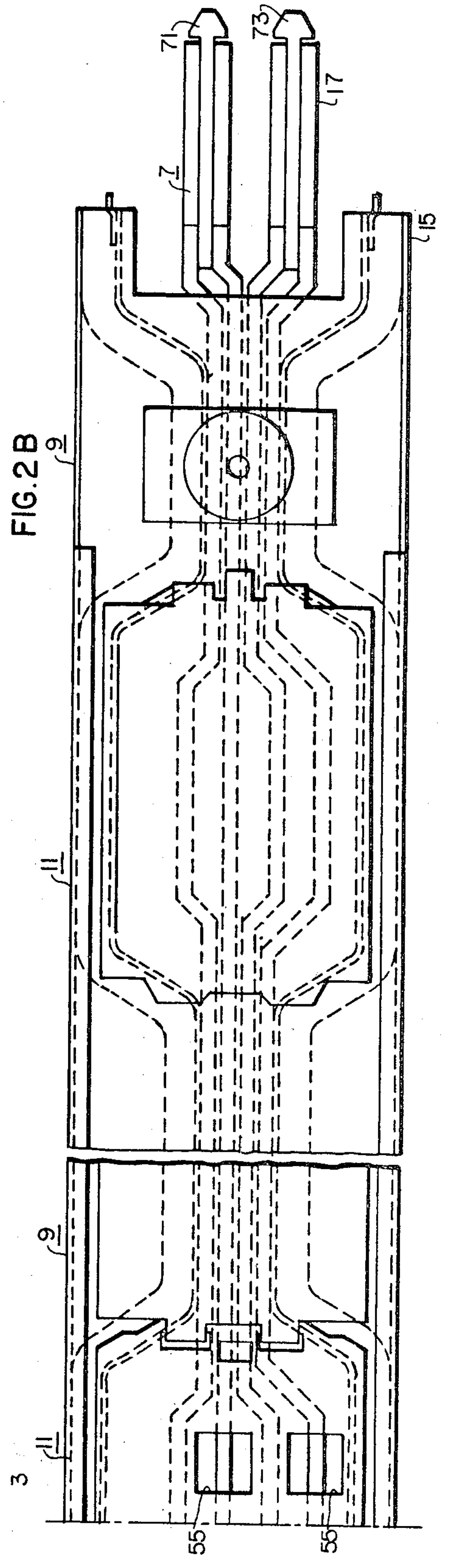

As can be understood with reference to FIGS. 2A and 2B, the bus bars 17 are offset at the connecting end part 5 and also at the connecting end part 7. Each of the bus bars 17 is provided with a slot 61 (FIGS. 1A, 1B and 8) at each of the two opposite ends thereof. At the connecting end part 5, an insulating spacing member 65 is provided at the outside of the uppermost bus bar and an insulating spacing member 67 is provided at the outside of the lowermost bus bar. An insulating spacing member 69 is provided in between the two center bus bars. At the connecting end part 7, an insulating spacing member 71 is provided between the two uppermost bus bars and an insulating spacing member 73 is provided between the two lowermost bus bars. All of the insulating spacing members at the connecting end parts 5 and 7 are rigid molded insulating spacing members with the insulating spacing members 71, 73 having slots therein to align with the slots 61 of the bus bars at the connecting end part 7 and with the insulating spacing members 65, 67, 69 having openings therein aligned with the slots 61 of the bus bars at the connecting end part 5. An elongated bolt 77, having an insulating tube 79 thereon, is passed through the openings in the insulating members and through the slots in the bus bars at the connecting end part 5 and through openings in metal plates 81, 83 that are secured to the housing at the connecting end part 5. A pair of spring washers 85, 87 are provided on the outside of the members 81, 83, and a nut 89 is threaded onto the bolt.

Figure 5:
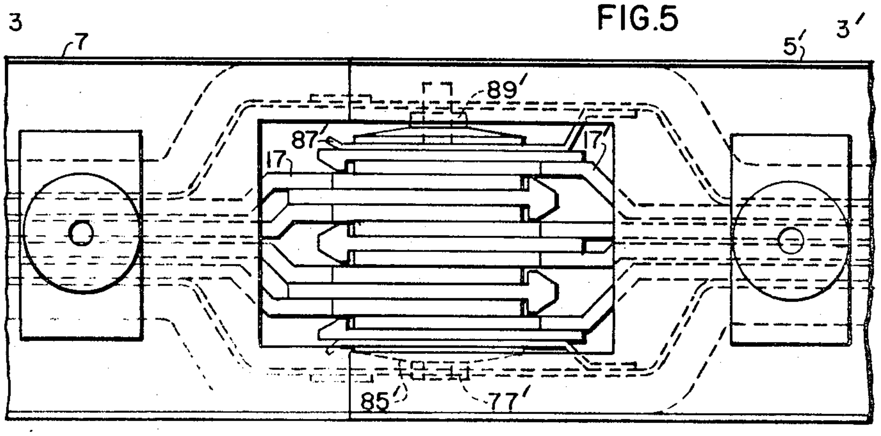
FIG. 5 is a side view, with parts broken away, illustrating an end-to-end type connection two sections.

Referring to FIG. 5, it will be understood that when two similar sections of bus duct are to be connected in an endlto-end relationship, at least one of the sections is moved longitudinally relative to the other section to move the bus bars of the sections into an overlapping relationship. The reference characters of the section on the right are primed for the purpose of clarity. The slots of the bus bars and insulating members of the connecting end part 7 of one section 3 receive the bolt 77' and insulating tube 79' that are supported on the connecting end part 5' of the other section 3'. The parts of the two sections are shown in FIG. 5 in the connected position with the connecting end part 7 of the one section 3 connected to the connecting end part 5' of the similar section 3'. As can be seen in FIG. 5, the side portions of the housing are open at the connection. The side portions can be closed and covered by means of a joint cover in the manner described in the above-mentioned copending application of Charles L. Weimer Ser. No. 146,202. When the sections are in the position seen in FIG. 5, the nut 89' of the section 3' is tightened applying pressure to the opposite spring washers 85', 87' to draw the bus bars and insulating members into a tight compact relationship to physically and electrically connect the bus bars of the two sections. The spring washers 85', 87' provide a biasing force to provide good contact pressure between the connected bus bars.

At each of the plug-in regions 11, a plug-in cover member 95 (FIGS. 1A, 1B, 2A and 2B) is pivotally supported on the associated plug-in insulating member and movable between open and closed positions so that the plug-in openings at the plug-in region are covered when a plug-in unit is not in position on the bus duct. At the installation, the bus duct is totally enclosed with all openings therein covered, and heat is dissipated from the bus duct at the compact regions 9 through the opposite aluminum housing members 33 which are in a good heat-conducting relationship with the wide faces of the outermost bus bars. In addition to being totally enclosed and providing good heat dissipation, the bus duct provides plug-in capability in that there are a plurality of plug-in regions 11 along the length of each section of bus duct. Plug-in units may be connected at either or both of the opposite sides of the plug-in regions to tap power off at selected positions along the length of the duct.

We claim:

1. An elongated unitary section of bus duct, said section comprising an elongated housing, a set of a plurality of elongated unitary bus bars, each of said bus bars comprising a pair of opposite wide faces and a pair of opposite narrow faces, said bus bars being supported in said housing in a generally stacked relationship with the wide faces thereof being in a face-to-face relationship, said set of bus bars comprising a first connecting end part at one end thereof and a second connecting end part at the other end thereof, said bus bars of each of said connecting end parts being spaced to receive additional bus bars and insulating means in a lap-type connection, said section being formed with a plurality of compact regions and a plurality of plug-in regions along the length of said section, at each of said compact regions said bus bars being sandwiched in a face-to-face compact relationship, at each of said plug-in regions said bus bars being spaced, a separate plug-in insulating means supported in said housing at each of said plug-in regions, each of said plug-in insulating means having opening means therein open at a narrow face side of said section for receiving plug-in elements, and said housing having opening means therein at each of said plug-in regions to provide access to said opening means in said plug-in insulating means.

2. An elongated unitary section of bus duct according to claim 1, said housing comprising a first pair of oppositely disposed housing members and a second pair of oppositely disposed housing members forming an elongated tubular housing, and said first pair of oppositely disposed housing members being disposed at the wide faces of the outermost bus bars of said set of bus bars to sandwich said set of bus bars therebetween in a compact relationship at said compact regions.

3. An elongated unitary section of bus duct according to claim 2, and said bus bars and each of said housing members of said first pair of housing members having a tortuous shape along the length thereof with said bus bars and said first pair of housing members extending inward to provide a compact sandwiched relationship at each of said compact regions and flaring outward at each of said plug-in regions providing space for plug-in capability at each of said plug-in regions.

4. A section of bus duct according to claim 2, said first pair of housing members being metallic heat conducting members for dissipating heat generated in said bus bars, and said second pair of housing members being mechanically rigid members for structural strength.

5. A section of bus duct according to claim 4, said first pair of housing members being members of a material selected from the group of aluminum and base alloys of aluminum, said second pair of housing members being members of steel.

6. A section of bus duct according to claim 3, said first pair of housing members being metallic heat conducting members for dissipating heat generated in said bus bars, and said second pair of housing members being mechanically rigid members for structural strength.

7. A section of bus duct according to claim 6, said first pair of housing members being members of a material selected from the group of aluminum and base alloys of aluminum, said second pair of housing members being members of steel.

8. An elongated unitary section of bus duct according to claim 1, each of said plug-in insulating means being rigid molded insulating means molded with barriers between adjacent bus bars and molded with a separate well cavity formed therein for each bus bar of said set of bus bars with adjacent well cavities being separate by insulating barrier means.

9. A section of bus duct according to claim 1, at each of said plug-in regions said insulating means having opening means therein open at each of the opposite narrow face sides of said section for receiving plug-in elements from each of the opposite narrow face sides of said section, and said housing having opening means therein at each narrow face side of each of said plug-in regions to provide access to said opening means in said plug-in means from each of the two opposite sides of said section.

10. A section of bus duct according to claim 9, and each of said insulating means comprising a pair of molded rigid insulating members each of which insulating members is disposed at a different one of said narrow face sides with each of said insulating members having opening means therein to provide plug-in capability at each of said plug-in regions.

* * * * *